United States Patent [19]

Sakamoto et al.

[11] Patent Number: 4,547,719
[45] Date of Patent: Oct. 15, 1985

[54] SYNCHRONOUS MOTOR DRIVE APPARATUS

[75] Inventors: Keiji Sakamoto, Hachioji; Shinji Seki, Tokyo, both of Japan

[73] Assignee: Fanuc Ltd, Minamitsuru, Japan

[21] Appl. No.: 460,982

[22] Filed: Jan. 25, 1983

[30] Foreign Application Priority Data

Jan. 28, 1982 [JP] Japan .................................. 57-012118

[51] Int. Cl.[4] .............................................. H02P 5/40
[52] U.S. Cl. .................................... 318/723; 318/811; 318/661
[58] Field of Search ................ 318/722, 723, 802–811, 318/661

[56] References Cited

U.S. PATENT DOCUMENTS

| | | | |
|---|---|---|---|
| 3,700,986 | 10/1972 | Cushman et al. | |
| 3,824,437 | 7/1974 | Blaschke | |
| 3,913,001 | 10/1975 | Kayama | 363/124 |
| 4,172,991 | 10/1979 | Akamatsu et al. | 318/722 |
| 4,272,715 | 6/1981 | Matsumoto | |
| 4,306,182 | 12/1981 | Curtiss | 318/811 |
| 4,361,794 | 11/1982 | Kawada | |
| 4,364,109 | 12/1982 | Okado et al. | |
| 4,445,167 | 4/1984 | Okado | 318/811 |

OTHER PUBLICATIONS

Salzmann, T., "Cycloconverters and Automatic Control of Ring Motors Driving Tube Mills," Siemans Rev., vol. 45, No. I, 1978, pp. 3–8.

Primary Examiner—David Smith, Jr.
Attorney, Agent, or Firm—Staas & Halsey

[57] ABSTRACT

To reduce adverse effects due to a dead zone in a pulse-width modulation circuit provided for avoiding short-circuiting in an inverter circuit, distortions of sine wave currents generated when low-frequency current commands are given, sound produced due to the excitation, and torque variations, a synchronous motor drive apparatus has been provided. The apparatus comprises a current detector circuit for detecting drive currents given to the synchronous motor, a difference output circuit for producing as outputs the differences between current commands given to the synchronous motor and the detected currents, a pulse-width modulation circuit for modulating signals indicative of the differences by way of pulse-duration modulation, an inverter circuit for driving the synchronous motor, a voltage detector circuit for detecting output voltages from output terminals of the inverter circuit, and a circuit for generating the differences between output voltages from the difference output circuit and the detected output voltages, whereby the synchronous motor can be driven by the outputs from the inverter circuit which is operated by voltage command values indicating the last-mentioned differences.

8 Claims, 9 Drawing Figures

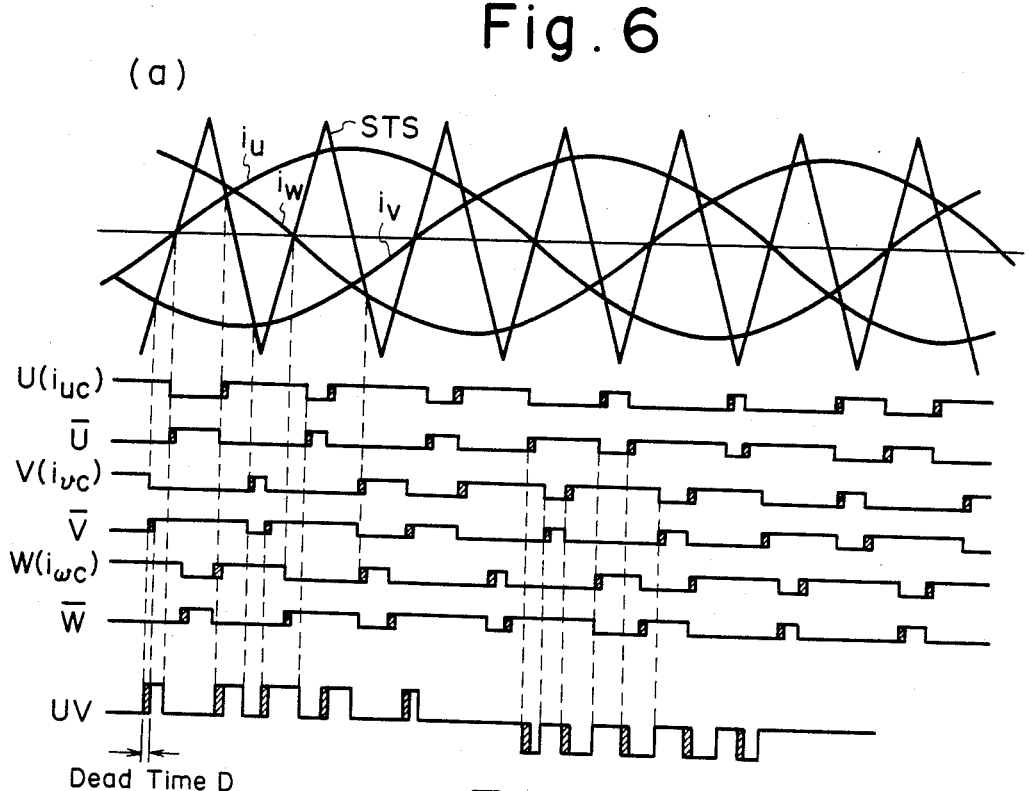
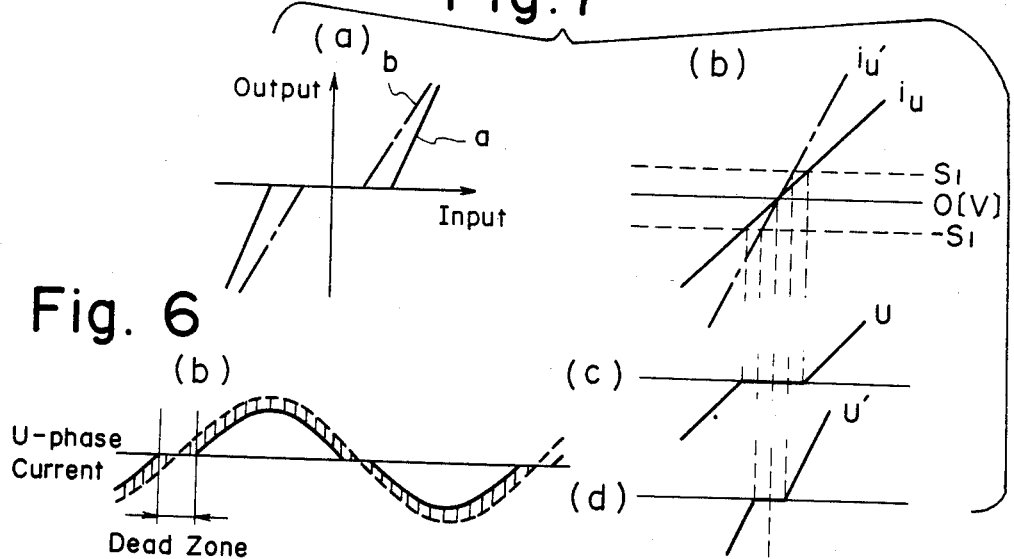

4,547,719

SYNCHRONOUS MOTOR DRIVE APPARATUS

BACKGROUND OF THE INVENTION

The present invention relates to a synchronous motor drive apparatus for driving a synchronous motor with a pulse-duration modulation system, and more particularly to a synchronous motor drive apparatus which is designed to prevent adverse effects due to the dead zone of a pulse-duration modulation circuit provided to avoid short-circuiting an inverter circuit.

Apparatus for driving AC synchronous motors under variable-speed control are generally arranged such that a sine-wave current command is modulated by pulse-duration or pulse-width modulation to drive an inverter circuit, and the size wave thus modulated is supplied to the synchronous motor. The apparatus therefore employs a pulse-duration modulation drive circuit and the inverter circuit is driven thereby. With this arrangement, only the inverter circuit at the final stage needs to be constructed so as to withstand a high voltage, the circuit structure is simple, and control is relatively easy to carry out.

For a three-phase AC drive mode, the inverter circuit has a total of six transistors with two transistors for each phase. The transistors in each phase are controlled so that they are alternately turned on and off during opposite phases. To prevent the transistors in each phase from being rendered conductive at the same time, that is, to prevent a DC power supply for feeding the inverter circuit from being short-circuited due to the switching of the transistors, there is included a dead time in a signal modulated by way of pulse-duration modulation for driving the transistors. The dead time is established by providing a dead zone in the pulse-duration modulation circuit. The dead time in the modulated signal, however, is disadvantageous in that it causes the modulated sine-wave current to be distorted, allows level produced by the excitation to be increased, and gives rise to torque variations, failing to generate a required torque. Particularly, thereby when the motor rotates at low speed, the sine-wave current command is of low frequency and influences due to the dead zone are increased to the point where they cannot be neglected.

SUMMARY OF THE INVENTION

It is an object of the present invention to provide a synchronous motor drive apparatus in which adverse effects due to the dead zone in a sine-wave current command are reduced.

Another object of the present invention is to provide a synchronous motor drive apparatus having a current feedback loop and a pulse-duration modulation circuit, and which employs a voltage feedback loop for compensation to reduce distortions of a sinusoidal current waveform which are developed by the dead zone of the pulse-duration modulation circuit.

Still another object of the present invention is to provide a synchronous motor drive apparatus having a current feedback loop and a pulse-duration modulation circuit, the apparatus also including a voltage detector circuit for detecting voltages from outputs issued by the inverter circuit and a circuit for generating the differences between phase voltages converted from a voltage between terminals and voltage commands corrected by the current feedback loop, for increasing the gain of the current feedback loop without damaging stability and for reducing distortions of a sinusoidal current waveform which are caused by the dead zone of the pulse-duration modulation circuit, the apparatus being especially capable of preventing distortions of the sine-wave current, increased sound accompanying the excitation, torque variations, and the like while low-frequency current command are being applied.

According to the present invention, a synchronous motor drive apparatus which has a current feedback loop and a pulse-duration modulation circuit includes a voltage feedback loop for reducing distortions or deviations of a current waveform from a sine wave which are caused by the dead zone of the pulse-duration modulation circuit. In general, sine-wave current commands are modulated by way of pulse-duration modulation to drive the inverter circuit for applying the modulated sine wave to the synchronous motor. For three-phase AC applications, the inverter circuit has two transistors in each phase, which are turned on and off alternately in opposite phase. To prevent the two transistors in each phase from becoming energized simultaneously and hence to prevent a DC power supply from being short-circuited, a dead time is inserted in each signal for driving the transistors, the dead time being established by providing a dead zone in the pulse-duration modulation circuit. The dead zone however tends to give rise to distortions of the modulated sine-wave current, increase excitation sound, and produce torque variations. These phenomena manifest themselves especially when the motor is supplied with low-frequency current commands. According to the present invention, therefore, there is provided a synchronous motor drive apparatus which is capable of avoiding adverse effects due to the dead zone provided in the pulse-duration modulation circuit to prevent the inverter circuit from being short-circuited. More specifically, the synchronous motor drive apparatus of the invention comprises a current detector circuit for detecting drive currents applied to the synchronous motor, a difference output circuit for producing as outputs the differences between current commands applied to the synchronous motor and the detected currents, a circuit for modulating signals indicative of the differences by way of pulse-duration modulation, and an inverter circuit for driving the synchronous motor, whereby the synchronous motor can be driven by outputs from the inverter circuit. The apparatus also includes a voltage detector circuit for detecting output voltages from output terminals of the inverter circuit, a circuit for converting outputs from the voltage detector circuit into voltages, and a circuit for generating the differences between output voltages from the difference output circuit and the detected output voltages and for applying outputs from the last-mentioned circuit to the pulse-duration modulation circuit.

The above and other objects, features and advantages of the present invention will become more apparent from the following description when taken in conjunction with the accompanying drawings in which a preferred embodiment of the present invention is shown by way of illustrative example.

BRIEFF DESCRIPTION OF THE DRAWINGS

FIG. 6a and 6b are diagrams of the waveforms of signals generated in the arrangement illustrated in FIG. 5.

FIG. 7 is a diagram illustrative of the way in which the circuit shown in FIG. 5 operates.

DESCRIPTION OF THE PREFERRED EMBODIMENT

Figure 1:
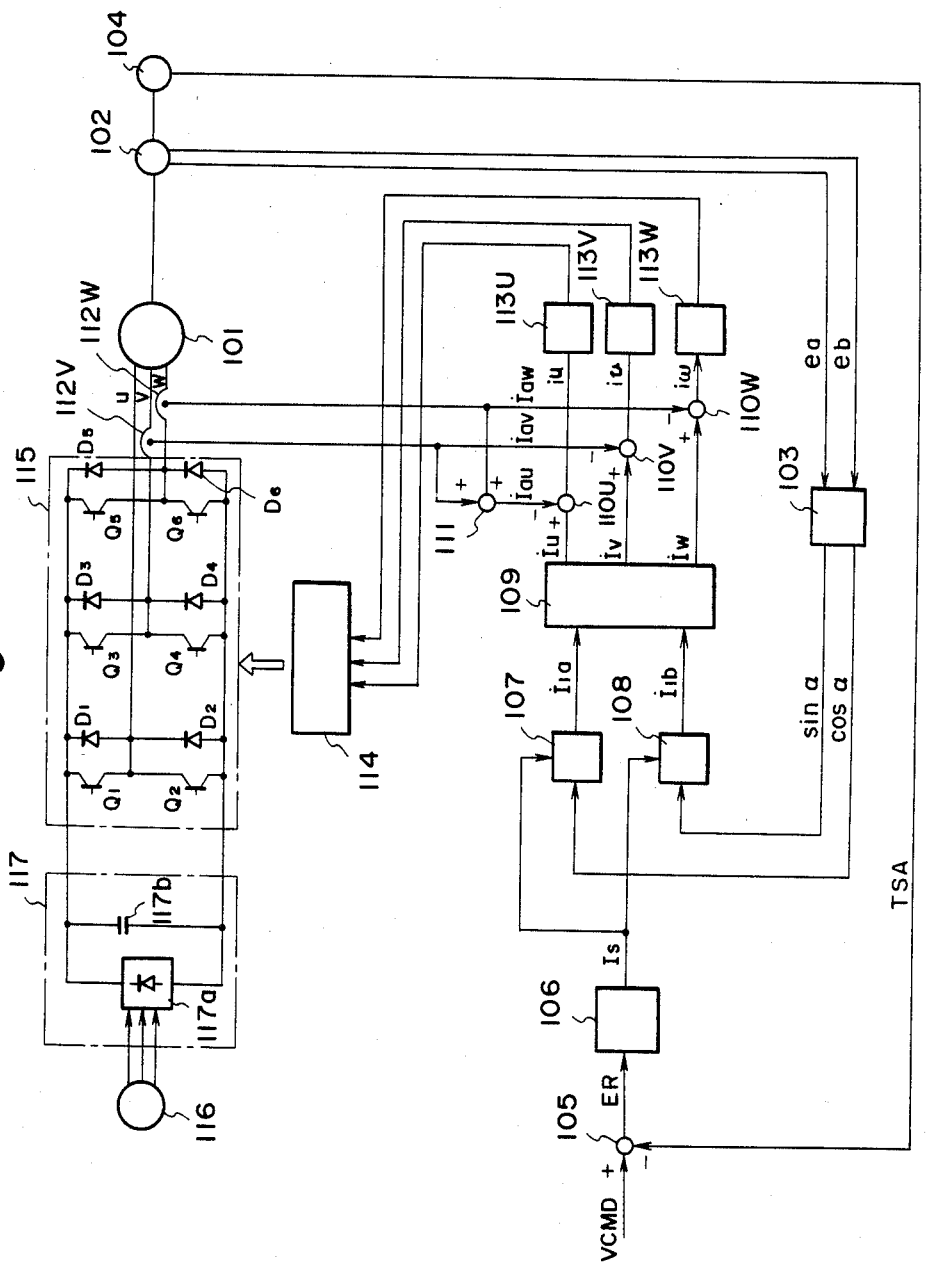
FIG. 1 is a block diagram of a synchronous motor drive apparatus according to an embodiment of the present invention.

FIG. 1 shows in block form a synchronous motor drive apparatus according to the present invention.

Figure 2:
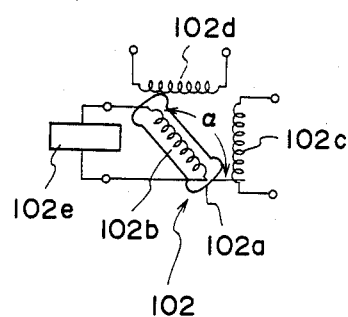
FIG. 2 is a a circuit diagram of a resolver in the apparatus shown in FIG. 1.

A synchronous motor 101 with a revolving magnetic field has an output shaft to which is coupled a resolver 102 for detecting the position of field poles. As shown in FIG. 2, the resolver 102 has a rotor 102a, a rotor winding 102b, two stator windings 102c, 102d disposed 90° out of phase with each other, and a carrier generator circuit 102e for generating a carrier of sin wot. When the rotor 102a is positioned at an angle $\alpha$, the stator windings 102c, 102d produce voltages which are expressed respectively as follows:

$$ea = \sin\alpha \sin wot \qquad (1)$$

$$eb = \cos\alpha \sin wot \qquad (2)$$

Figure 3:
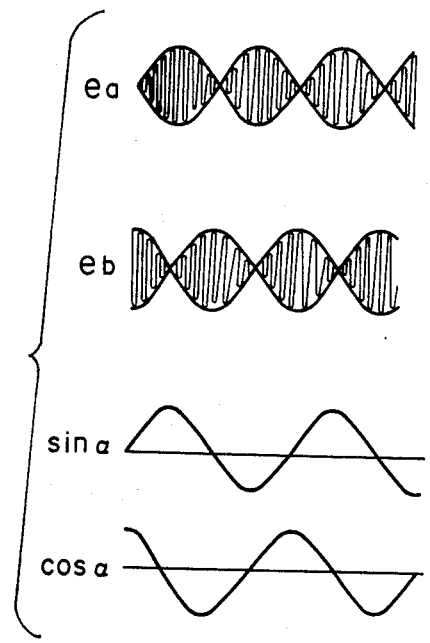
FIG. 3 is a diagram illustrative of the manner in which the resolver of FIG. 2 operates.
Figure 4:
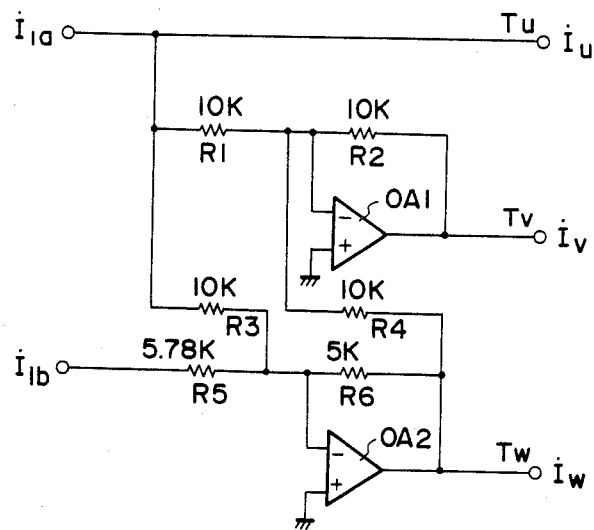
FIG. 4 is a circuit diagram of a two-phase-to-three-phase converter in the apparatus of FIG. 1.

The angle $\alpha$ is also indicative of the position of the field poles of the synchronous motor 101. Therefore, as shown in FIG. 3, the resolver 102 produces a sine voltage ea and a cosine voltage eb dependent on the angular position $\alpha$ of the field poles of the synchronous motor 101. A synchronous rectifier circuit 103 rectifies the sine voltage ea and the cosine voltage eb in synchronism to generate $\sin\alpha$ and $\cos\alpha$ (FIG. 3). A tachometer generator 104 produces an actual-speed voltage TSA proportional to the speed of rotation of the synchronous motor 101. Designated at 105 is an arithmetic circuit for determining the difference ER (hereinafter referred to as a "speed error") between a speed command voltage VCMD commanded by a speed command circuit (not shown) and the actual-speed voltage TSA, 106 an error amplifier for amplifying the speed error ER to produce an amplitude Is of an armature current, 107, 108 multipliers for multiplying the output from the error amplifier with the outputs $\cos\alpha$, $\sin\alpha$ from the synchronous rectifier circuit 103 to produce two-phase current commands İla ($=$Is·sin $\alpha$), İlb ($=$Is·cos $\alpha$), and 109 a two-phase-to-three-phase converter having a circuit arrangement as shown in FIG. 4 for converting a two-phase signal into a three-phase signal. More specifically, the two-phase-to-three-phase converter 109 has two operational amplifiers OA1, OA2, resistors R1 through R4 of 10 KΩ, a resistor R5 of 5.78 KΩ, and a resistor R6 of 5 KΩ. With the resistors R1–R6 having such resistances and wired as shown, the following outputs are available from terminals Tu, Tv, Tw:

$$\dot{I}u = \dot{I}la$$

$$\dot{I}v = -\tfrac{1}{2}\dot{I}la + 3/2\,\dot{I}lb$$

$$\dot{I}w = -\tfrac{1}{2}\dot{I}la - 3/2\,\dot{I}lb \qquad (3)$$

The outputs İu, İv, İw are ⅔ out of phase with each other, and constitute three-phase current commands in phase with the induced voltage Eo.

Indicated at 110U, 110V, 110W are arithmetic circuits in the respective phases for computing the differences between the command currents İu, İv, İw and actual phase currents İau, İav, İaw, 111 an arithmetic circuit for adding Iav and Iaw to produce the phase current İau of a phase U, 112V, 112W current transformers for detecting the phase currents İav, İaw of phases V, W, respectively, 113U, 113V, 113W current error amplifiers in the respective phases for amplifying current differences in the phases, 114 a or pulse-width modulation circuit, 115 an inverter controllable by an output signal from the pulse-duration-modulation circuit, 116 a three-phase AC power supply, and 117 a known rectifier circuit for rectifying three-phase alternating currents into a direct current, the rectifier circuit being composed of a group of diodes 117a and a capacitor 117b.

Operation of the apparatus shown in FIG. 1 will now be described with reference to an application in which a speed command is increased when the synchronous motor 101 rotates at a certain speed.

To rotate the synchronous motor at a desired speed Vc, an addition terminal of the arithmetic circuit 105 is supplied with a speed command voltage VCMD having a preset analog value. The synchronous motor rotates at an actual speed Va ($<$ Vc) at this time, and hence the tachometer generator 104 produces as an output an actual-speed voltage TSA proportional to the actual speed Va, the actual-speed voltage TSA being applied to a subtraction terminal of the arithmetic circuit 105. The arithmetic circuit 105 determines a speed error ER which is the difference between the command speed Vc and the actual speed Va, and supplies the speed error ER to the error amplifier 106, which then effects an arithmetic operation of proportional integration as expressed by the following equation:

$$Is = Kl(Vc-Va) + K2\Sigma(Vc-Va)$$

$$\Sigma(Vc-Va) = \Sigma(Vc-Va) + (Vc-Va) \qquad (4)$$

The result Is of the arithmetic operation based on equation (4) corresponds to the amplitude of the armature current. Accordingly, when the load varies or the speed command changes, the speed error ER ($=$Vc$-$Va) becomes greater, and the armature current amplitude Is also becomes greater. The increased armature current amplitude results in a greater torque produced by the synchronous motor 101, which torque raises the actual speed of rotation of the motor into conformity with the command speed. The above operation will be described in more detail. The two-phase sine and cosine waves $\sin\alpha$, $\cos\alpha$ which are indicative of the position (at the angle $\alpha$) of the field poles of the synchronous motor 101 are produced by the resolver 102 and the synchronous rectifier circuit 103.

Then, the two-phase-to-three-phase converter circuit 109 effects the arithmetic operation as defined by the equations (3) and generates three-phase current commands İu, İv, İw, respectively, which are in phase with the induced voltage Eo in the synchronous motor 101.

Thereafter, the arithmetic circuits 110U, 110V, 110W determine the differences between the three-phase current commands İu, İv, İw and actual phase currents İau, iav, iaw. Three-phase AC signals iu, iv, iw indicative of such differences are amplified by the current error amplifiers 113U, 113V, 113W and applied respectively to the pulse-duration-modulation circuit 114.

The pulse-duration modulation circuit 114 compares the amplitudes of the three-phase AC signals iu, iv, iw with the amplitude of the sawtooth signal STS, and delivers three-phase current commands produced by way of pulse-duration modulation to the bases of power transistors Q1–Q6 in the inverter 115 to turn on and off the power transistors Q1–Q6 for supplying three-phase currents to the synchronous motor 101. The synchronous motor 101 will subsequently be controlled in the similar manner until the motor will eventually rotate at the command speed.

Figure 5:
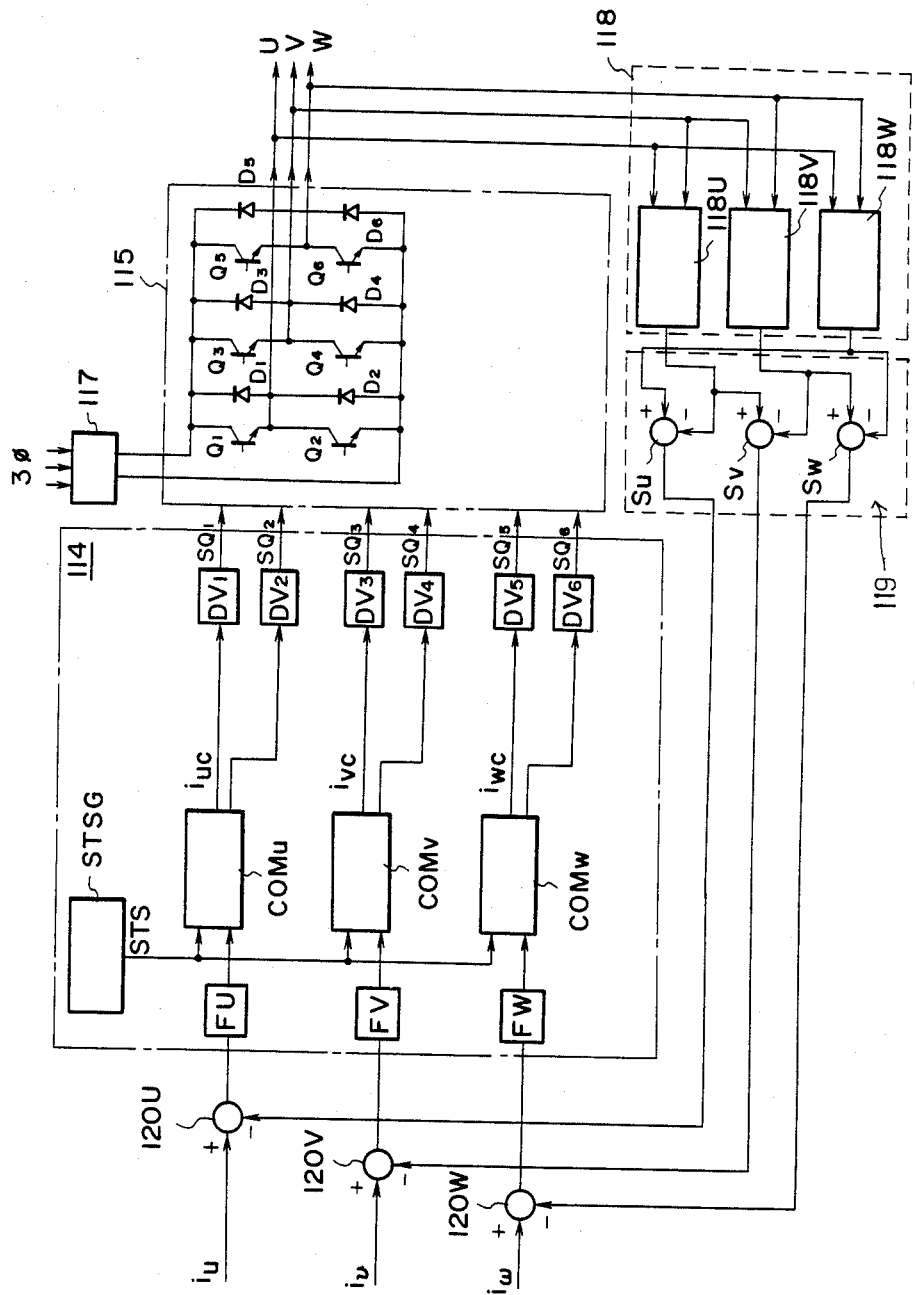
FIG. 5 is a block diagram of a portion of the apparatus shown in FIG. 1.

As shown in FIG. 5, the conventional pulse-duration modulation circuit 114 comprises filters FU, FV, FW having a time lag of a first order, a sawtooth generator generator STSG for generating the sawtooth signal STS, comparators COMU, COMV, COMW, and drivers DV1 through DV6. The inverter 115 is composed of the six transistors Q1 through Q6, and diodes D1 through D6. Operation of the circuit arrangement shown in FIG. 5 will be described with reference to the signal waveforms illustrated in FIGS. 6 and 7. The comparators COMU, COMV, COMW of the pulse-duration modulation circuit 114 compare the sawtooth signal STS with the three-phase AC signals iu, iv, iw, and issue signals of a logic level "1" when the signals iu, iv, iw are larger than the signal STS, and signals of a logic level "0" when the signals iu, iv, iw are smaller than the signal STS. As for the signal iu in particular, the comparator COMU produces current commands iuc, iuc modulated by way of pulse-duration modulation as shown in FIG. 6(a). Thus, three-phase voltage commands iuc(U), ivc(V), iwc(W) modulated by way of pulse-duration modulation and their inverted signals $\overline{U}$, $\overline{V}$, $\overline{W}$ are generated dependent on the amplitudes of the signals iu, iv, iw. The three-phase command signals U, V, W and their inverted signals $\overline{U}$, $\overline{V}$, $\overline{W}$ are fed as inverter drive signals through the drivers DV1–DV6 to the inverter 115. The three-phase voltage commands U, V, W are applied to the bases of the power transistors Q1, Q3, Q5 of the inverter 115, and the inverted signals $\overline{U}$, $\overline{V}$, $\overline{W}$ are applied to the bases of the power transistors Q2, Q4, Q6, for rendering the transistors Q1 through Q6 conductive and nonconductive alternately to supply three-phase voltage to the synchronous motor 101. The comparators COMU, COMV, COMW have a dead zone as shown in FIG. 7(a) to provide a dead time D in command signals for phases U, $\overline{U}$, V, $\overline{V}$ and W, $\overline{W}$, so that these command signals will not go high simultaneously. This means that the comparators for comparating the sawtooth signal STS have a bandwidth having an amplitude S1, −S1 indicated by the value of the dead zone, as shown in FIG. 7(b). Therefore, an output which is modulated by way of pulse-duration modulation is produced as shown in FIGS. 7(c), 7(d) with the amplitude S1, −S1 providing threshold levels as illustrated in FIG. 7(b). The three-phase voltage command signals U, V, W and their inverted signals $\overline{U}$, $\overline{V}$, $\overline{W}$ become pulse signals having hatched portions removed as shown in FIG. 6, a pattern which is different from ordinary normal and inverted signals. A current flowing in the synchronous motor 101 as shown in FIG. 6(b) therefore has a hatched portion removed and has a waveform pattern which is not a sine wave, but is shown by the solid line in FIG. 6(b). As is apparent from the operating principle shown in FIG. 7(b), the greater the slope of the three-phase AC signals iu, iv, iw, that is, the lower the frequency of the signals, the larger the influences of the dead zone due to the dead time. Stated otherwise, the lower the speed of rotation of the motor, the greater the variations in the torque of the motor. Complete elimination of the dead time D goes counter to the basis and reasons for providing such dead time. Accordingly, the present invention is designed to minimize any adverse effects the dead time has on the operation of the motor.

Figure 8:
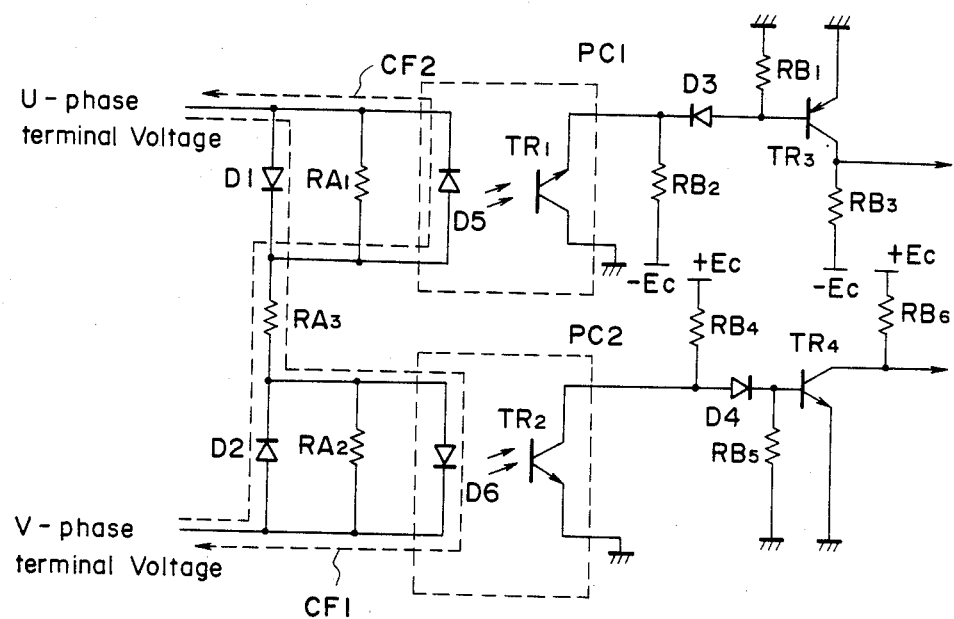
FIG. 8 is a block diagram of an interphase voltage detector in the circuit arrangement of FIG. 5.

According to the present invention, there is provided a feedback loop which, as shown in FIG. 5, comprises an interphase voltage detector circuit 118 for detecting the voltages between phases from the U-, V-, and -W output voltages of the inverter circuit 115, a converter circuit 119 provided in the respective phases for converting the interphase voltages into phase voltages, and arithmetic circuits 120U, 120V, 120W for subtracting the outputs from the converter circuit 119 from the three-phase AC signals iu, iv, iw. The interphase voltage detector circuit 118 is composed of an interphase voltage detector 118U for detecting the interphase voltage between the phases U and V, an interphase voltage detector 118V for detecting the interphase voltage between the phases V and W, an interphase voltage detector 118W for detecting the interphase voltage between the phases W and U. The converter circuit 119 serves as an interphase voltage computing circuit for determining voltages in phases U, V and W, respectively, from the differences between the interphase voltages. As shown in FIG. 8, the interphase voltage detector 118U has its input and output connected by photocouplers PC1, PC2 which isolate the input of a high potential from the output of a low potential.

The input of the interphase voltage detector 118U includes a pair of diodes D1, D2, a pair of bypass resistors RA1, RA2, a pair of light-emitting diodes D5, D6 which constitute part of the photocouplers PC1, PC2, and a coupling resistor RA3 which interconnects the phases U and V. When the U-phase terminal voltage is higher than the V-phase terminal voltage, a current flows in the direction of the arrow CF1 from the diode D1 through the resistor RA3 to the light-emitting diode D6 to energize the latter. When the V-phase terminal voltage is higher than the U-phase terminal voltage, a current flows in the direction of the arrow CF2 from the diode D2 through the resistor RA3 to the light-emitting diode D5 to energize the latter. The output of the interphase voltage detector 118U is composed of a pair of output transistors TR3, TR4, bias resistors RB3, RB6 for the output transistors, respectively, base resistors RB1, RB5, RB2, RB4, and phototransistors TR1, TR2 which form part of the photocouplers PC1, PC2, respectively. When the light-emitting diode D6 of the photocoupler PC2 is energized to thereby drive the phototransistor TR2 (that is, when the U-phase terminal voltage is higher then the V-phase terminal voltage), the potential at the base of the transistor TR4 drops from +Ec to de-energize the transistor TR4, whereupon the potential at the collector of the transistor TR4 increases from 0 to +Ec, thus producing an interphase voltage between the phases U and V on the positive side. Likewise, when the light-emitting diode D5 of the photocoupler PC1 is energized to thereby drive the phototransistor TR3 (that is, when the V-phase terminal voltage is higher then the U-phase terminal voltage), the potential at the base of the transistor TR3 increases from −Ec to de-energize the transistor TR3, whereupon the potential at the emitter of the transistor TR3 drops from 0 to −Ec, thus producing an interphase voltage between the phases U and V on the negative side. An interphase voltage between the phases U and V can be obtained by adding the interphase voltages between the phases U and V on the positive and negative sides. The other interphase voltage detectors 118V, 118W are constructed and operate in the same manner.

Operation of the feedback loop of FIG. 5 will now be described. The interphase voltage detectors 118U, 118V, 118W are responsive to the three-phase terminal voltages U, V, W from the inverter 115 for detecting the interphase voltages. Phase voltage computing circuits SU, SV, SW of the converter circuit 119 compute and deliver phase voltages in the respective phases U, V and W. These phase voltages are substracted by the arithmetic circuits 120U, 120V, 120W from the three-phase AC signals iu, iv, iw, and outputs from the arithmetic circuits 120U, 120V, 120W are applied as three-phase AC signals to the pulse-duration modulation circuit 114. Accordingly, the three-phase AC signals are corrected by the voltage feedback. The larger the output from the inverter circuit 115, the greater the signals fed back through the feedback loop, and hence the feedback loop is effective to change the gain of the current loop.

The feedback loop serves to increase the gain as the three-phase AC signals iu, iv, iw become greater, and to reduce the gain as the three-phase AC signals iu, iv, iw become smaller. Through raising the gain of the current loop by the amount equivalent to a reduced gain due to the action of the feedback loop, the influences of the dead zone due to the dead time can be reduced without imparing stability.

As shown in FIG. 7(a), the effective dead zone can be made smaller as shown by the lines b than a conventional dead zone indicated by the lines a which is produced when there is no feedback loop. This is equivalent, when considered by way of three-phase AC signals, to the fact that the slope of a three-phase AC signal can be increased from iu to iu'. Therefore, the dead zone in the current waveform as shown in FIG. 6(b) is reduced, with the results that the current waveform approaches a sine wave and particularly a torque variation is reduced.

With the arrangement of the present invention, as described above, a synchronous motor drive apparatus having a current feedback loop and a pulse-duration modulation circuit comprises a voltage detector circuit for detecting voltages from outputs from an inverter circuit, and a circuit for producing the differences between currents generated by the detected voltages and current errors corrected by the current feedback loop. The apparatus can increase the gain of a current loop without damaging stability, and reduce deviations of a current waveform from a sine wave which are caused by the dead zone of the pulse-duration modulation circuit. The apparatus is advantageous in that it particularly prevents torque changes from being produced when a low-frequency current command is being given, sound such as a beat generated due to the motor excitation can be decreased, and the synchronous motor can be driven with stability.

Although a certain preferred embodiment has been shown and described in detail, it should be understood that many changes and modifications may be made therein without departing from the scope of the appended claims.

What we claim is:

1. An apparatus for driving a synchronous motor, comprising:
    a current detector circuit for detecting drive currents applied to the synchronous motor;
    a current command circuit for producing current commands which drive the synchronous motor on the basis of a signal detected from an output side of the synchronous motor;
    a difference output circuit, operatively connected to said current detector circuit and said current command circuit, for producing as outputs first differences between the current commands and the detected drive currents;
    a pulse width modulation circuit, operatively connected to the motor, for producing inverter control signals;
    an inverter circuit, operatively connected to said pulse width modulation circuit and said current detector circuit, for producing phase voltages for driving the synchronous motor; and
    a voltage feedback loop comprising conversion means, operatively connected to said inverter circuit to receive the phase voltages applied to the motor, to said difference output circuit and to said pulse width modulation circuit, for converting the phase voltages to interphase voltages, for converting the interphase voltages to phase voltage signals, for combining the phase voltage signals with the first differences and for appling the combinations to said pulse width modulation circuit for controlling same.

2. An apparatus according to claim 1, wherein said conversion means comprises:
    interphase voltage detector circuits, operatively connected to said inverter circuit, for producing the interphase voltages between respective phases from the phase voltages produced by said inverter circuit;
    converter circuits in the respective phases, operatively connected to said interphae voltage detector circuits, for converting the interphase voltages into the phase voltage signals; and
    arithmetic circuits, operatively connected to said difference output circuit, said pulse width modulation circuit and said converter circuits, for subtracting the phase voltage signals from the first differences.

3. An apparatus according to claim 2, wherein each said interphase voltage detector circuit comprises interphase voltage detectors for detecting voltage differences between the phases and successive phases, and each said converter circuit comprises phase voltage computing circuits for producing as outputs the phase voltage signals from the difference between interphase voltages.

4. An apparatus according to claim 3, wherein each of said interphase voltage detectors comprises an input, an output, and a photocoupler by which said input and output are interconnected.

5. An apparatus according to claim 4, wherein said apparatus is driven by three-phase alternating currents.

6. An apparatus according to claim 2, wherein each of said interphase voltage detector circuits comprise:
    a first diode operatively connected to one phase of said inverter circuit;
    a second diode operatively connected to another phase of said inverter circuit;
    a coupling resistor operatively connected between said first and second diodes;

a first photocoupler operatively connected to said first diode and said coupling resistor;

a second photocoupler operatively connected to said second diode and said coupling resistor;

a first output transistor operatively connected to said first photocoupler and said arithmetic circuits; and a second output transistor operatively connected to said second photocoupler and said arithmetic circuits.

7. An apparatus according to claim 2, wherein each converter circuit comprises an arithmetic circuit.

8. A synchronous motor control apparatus, comprising:

inverter means for producing phase voltages which drive the motor;

pulse width modulation means for controlling the inverter and providing a dead time between phase voltages;

current command means for providing current control signals in dependence upon a difference between a current command and actual current supplied to the motor; and dead time reduction means for monitoring the phase voltages, reducing the dead time by producing interphase voltages and modifying the difference in dependence upon the interphase voltages, and applying the modified difference to said pulse width modulation means for controlling same.

* * * * *

UNITED STATES PATENT AND TRADEMARK OFFICE
CERTIFICATE OF CORRECTION

PATENT NO. : 4,547,719

DATED : October 15, 1985

INVENTOR(S) : KEIJI SAKAMOTO ET AL.

It is certified that error appears in the above-identified patent and that said Letters Patent is hereby corrected as shown below:

Col. 1, line 38, after "allows" insert --the sound--.

Col. 4, line 14, after "a" insert --pulse-duration--.

Col. 8, line 31, "appling" should be --applying--;

line 40, "interphae" should be --interphase--.

Signed and Sealed this

Fourth Day of March 1986

[SEAL]

Attest:

DONALD J. QUIGG

Attesting Officer

Commissioner of Patents and Trademarks